Figure 1:
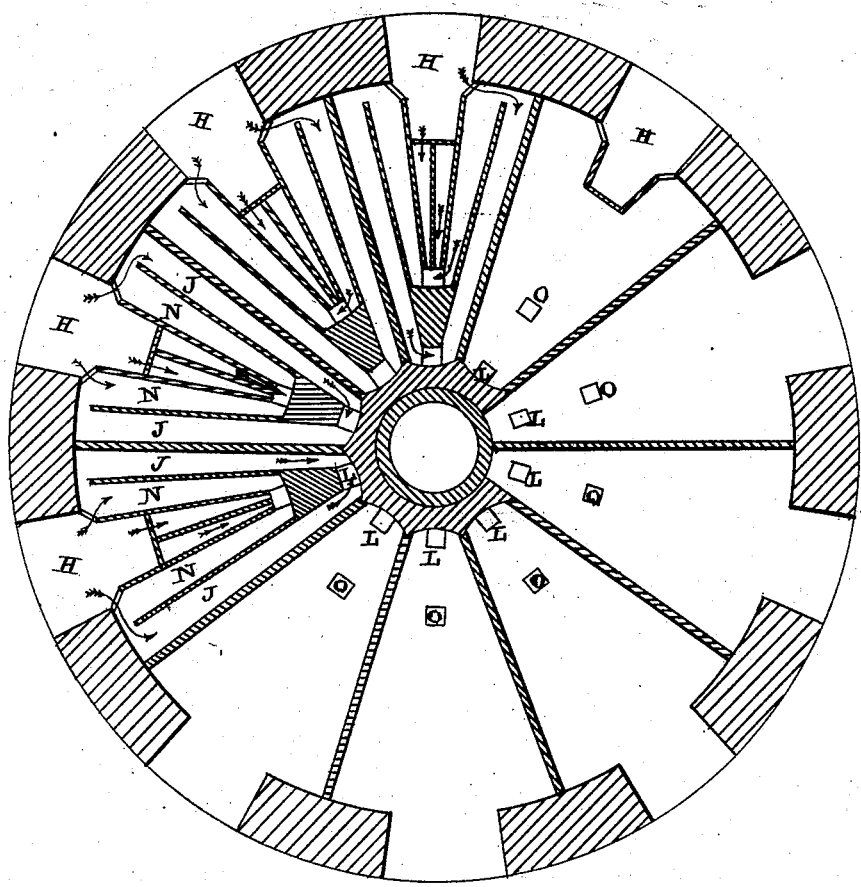

(No Model.)

J. HARDWICK.
POTTERY KILN.

No. 259,854. Patented June 20, 1882.

Witnesses.
William W. Mortimer
W. H. Kern

Inventor
Jno. Hardwick,
per
F. A. Lehmann,
Atty (No Model.)
2 Sheets—Sheet 2.
J. HARDWICK.
POTTERY KILN.
No. 259,854.
Patented June 20, 1882.
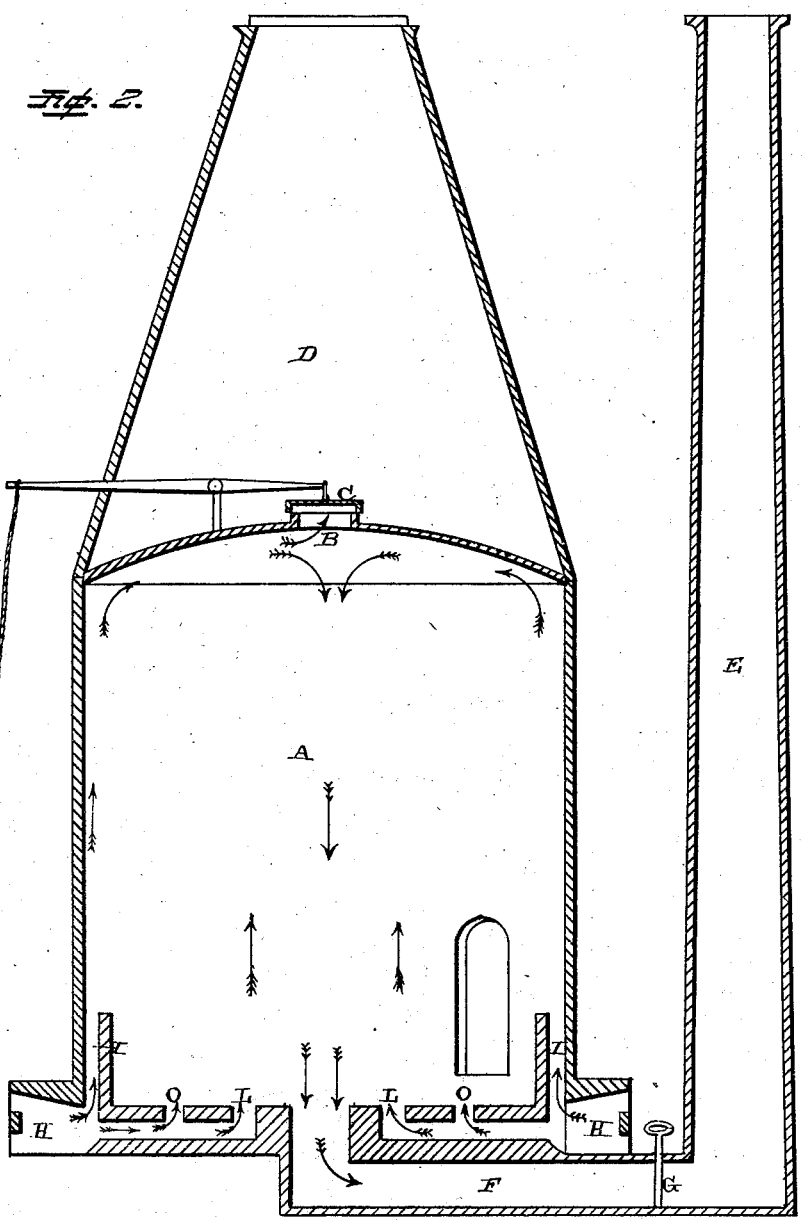
Witnesses.
Wm. W. Mortimer
W. H. Kern
Inventor.
Jno. Hardwick,
per
F. A. Lehmann,
Atty.

UNITED STATES PATENT OFFICE.

JOHN HARDWICK, OF EAST LIVERPOOL, OHIO.

POTTERY-KILN.

SPECIFICATION forming part of Letters Patent No. 259,854, dated June 20, 1882.

Application filed March 27, 1882. (No model.)

*To all whom it may concern:*

Be it known that I, JOHN HARDWICK, of East Liverpool, in the county of Columbiana and State of Ohio, have invented certain new and useful Improvements in Pottery-Kilns; and I do hereby declare the following to be a full, clear, and exact description of the invention, such as will enable others skilled in the art to which it pertains to make and use it, reference being had to the accompanying drawings, which form part of this specification.

My invention relates to an improvement in pottery-kilns; and it consists in a central flue which is made through the bottom of the oven, suitable flues which connect with vertical openings or flues made through the bottom of the oven, and suitable mouths or fire-places from which the products of combustion pass toward the central flue through the bottom of the oven, all of which will be more fully described hereinafter.

The object of my invention is to construct a bottom for kilns which is adapted to be used in connection with any of the kilns now in use, and which will permit either an upward or a downward draft to be used, as may be preferred.

Figure 1 is a horizontal section taken through the kiln, showing a portion of the flues exposed; and Fig. 2 is a vertical section of the same.

A represents a suitable kiln, such as is used in the burning of pottery-ware, and which is provided with an opening, B, through its top, which opening is closed by the valve C when it is desired to prevent the products of combustion from escaping at that point. This valve will be operated by means of a lever, which has the cord, wire, or chain attached to its outer end, and which extends down to within easy reach of the operator on the outside of the kiln. A suitable chimney or stack, D, is formed above the top of the kiln, so as to cause a suitable draft when the kiln is to have the products of combustion escape through its top. Also, connected to the kiln is the stack E, which is connected with the kiln by means of the flue F, which is provided with the damper G, and which flue has its inner end turned vertically, so as to open in the center of the kiln. Around the sides of the kiln, at equal distances apart, are made the mouths or fire-places H, with which are connected the fire-bags I. These fire-bags consist of vertical flues, which extend any suitable distance upward along the inside of the kiln, and through which a portion of the products of combustion pass. Leading from each one of these mouths or fire-places are a number of horizontal flues, preferably six in number, which extend diagonally inward toward the opening or flue which is made through the center of the bottom of the kiln. The two larger or outside ones, J, of these flues communicate with the inner one, L, of the openings made through the bottom of the kiln, and which are placed around the large central opening. The other ones of the flues N connect with the openings O, which are also placed around the central opening and the openings L.

When the fires are built in the mouths or fire-places and the damper in the top of the kiln is closed and the damper in the flue leading to the second stack, E, is opened, the products of combustion pass through the fire-bags and the horizontal flues, up through the concentric openings L and O, up toward the top of the kiln, where they are deflected downward and pass off through the central opening to the stack E. When, however, the damper in the top of the kiln is opened and the damper in the flue leading to the stack E is closed, the products of combustion pass off through the top of the kiln.

By means of the construction above described it will be seen that the kiln may be used either with an outward or a downward draft, as may be preferred.

As the horizontal flues made in the bottom of the kiln are built in the brick-work, my invention is adapted to be applied to any of the kilns now in use.

By having the downward draft as here shown, fully one-third of the amount of fuel can be saved, for the heat in the kiln can always be regulated to any required degree by means of the two dampers.

Having thus described my invention, I claim—

1. In a pottery-kiln, the combination of the fire-place H, the flues J, leading therefrom and connecting with the opening L, and the flues N, connecting with the opening O, substantially as shown.

2. In a pottery-kiln, the combination of the two stacks D E, regulating-valves C G, fire-places H, flues J N, openings L O, and fire-bags I, substantially as specified.

In testimony whereof I affix my signature in presence of two witnesses.

JOHN HARDWICK.

Witnesses:
H. R. HILL,
E. D. MANHALL.